US008790516B2

(12) United States Patent
Ruonala et al.

(10) Patent No.: US 8,790,516 B2
(45) Date of Patent: Jul. 29, 2014

(54) METHOD FOR REMOVING ARSENIC AS SCORODITE

(75) Inventors: Mikko Ruonala, Kantvik (FI); Jaakko Leppinen, Noormarkku (FI); Ville Miettinen, Pori (FI)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 13/202,762

(22) PCT Filed: Feb. 19, 2010

(86) PCT No.: PCT/FI2010/050114
§ 371 (c)(1),
(2), (4) Date: Aug. 22, 2011

(87) PCT Pub. No.: WO2010/094841
PCT Pub. Date: Aug. 26, 2010

(65) Prior Publication Data
US 2011/0309029 A1    Dec. 22, 2011

(30) Foreign Application Priority Data
Feb. 23, 2009  (FI) ...................... 20090066

(51) Int. Cl.
| B01D 21/00 | (2006.01) |
| C02F 1/52 | (2006.01) |
| B03D 3/00 | (2006.01) |
| C02F 1/72 | (2006.01) |
| C01G 1/00 | (2006.01) |
| C01G 49/00 | (2006.01) |
| C01G 51/00 | (2006.01) |
| C01G 53/00 | (2006.01) |
| C22B 1/00 | (2006.01) |
| C22B 23/00 | (2006.01) |
| C22B 7/00 | (2006.01) |
| C22B 30/04 | (2006.01) |
| C22B 3/44 | (2006.01) |
| C02F 1/68 | (2006.01) |
| C02F 1/00 | (2006.01) |
| B01D 37/00 | (2006.01) |
| C01G 28/00 | (2006.01) |
| C01G 29/00 | (2006.01) |
| C01G 30/00 | (2006.01) |
| C02F 1/74 | (2006.01) |
| C02F 101/10 | (2006.01) |
| C02F 101/20 | (2006.01) |

(52) U.S. Cl.
CPC . C22B 7/006 (2013.01); C02F 1/74 (2013.01); C02F 2101/103 (2013.01); C02F 1/722 (2013.01); C22B 30/04 (2013.01); C02F 1/72 (2013.01); C02F 1/001 (2013.01); C02F 2101/203 (2013.01); C22B 3/44 (2013.01); C01G 49/0018 (2013.01)
USPC ........... 210/710; 210/712; 210/721; 210/722; 210/724; 210/737; 210/758; 210/766; 210/768; 423/87; 423/138; 423/140; 423/141

(58) Field of Classification Search
None
See application file for complete search history.

(56) References Cited

U.S. PATENT DOCUMENTS 7,314,604 B1 *  1/2008  Harvey et al. ............... 423/87
7,615,199 B2 * 11/2009  Poijarvi et al. .............. 423/24

FOREIGN PATENT DOCUMENTS

WO       0123628 A1     4/2001
WO    2006117424 A1    11/2006

OTHER PUBLICATIONS

Monhemius, A. J., et al. "Removing and Stabilizing as from copper Refining Circuits by Hydrothermal Processing", Journal of The Minerals, Metals & Materials Society, 1999, 51, 30-33, SpringerLink.*

(Continued)

Primary Examiner — Nam Nguyen
Assistant Examiner — Clare Perrin
(74) Attorney, Agent, or Firm — Chernoff Vilhauer McClung & Stenzel LLP

(57) ABSTRACT

The invention relates to a method for removing arsenic as scorodite from solutions that contain iron and arsenic. In accordance with the method, arsenic is first precipitated as ferric arsenate and subsequently processed hydrothermally into crystalline scorodite.

16 Claims, 1 Drawing Sheet

(56) References Cited

OTHER PUBLICATIONS

Caetano, M. L., et al. "Batch and continuous precipitation of scorodite from dilute industrial solutions", Hydometallurgy, 2002, 95, 44-52, Elsevier.*

Caetano, et al. "Batch and continuous precipitation of scorodite from dilute industrial solutions", Hydrometallurgy, 2009, 95, 44-52, Elsevier.*

Monhemius, et al. "Removing and Stabilizing as from Copper Refining Circuits by Hydrothermal Processing", Journal of Minerals, Metals & Materials Society, 1999, 30-33.*

Monhemius A.J. et al, Removing and Stabilizing as from Copper Refining Circuits by Hydrothermal Processing. JOM, Sep. 1999, 30-33.

Antti Hoikkala, International Search Report for PCT/FI2010/050114, Jun. 3, 2010.

Xiang Xuesong et al, "A study on the removal of arsenic from leaching liquor of arsenic-containing alkaline dregs by precipitation as ferric arsenates," China's Manganese Industry, vol. 24, No. 1, Feb. 28, 2006, 4 pages.

Notification of the First Office Action for Chinese Patent Application No. 201080006799.5, issued Mar. 18, 2013.

Chinese Office Action for Chinese Application No. 201080006799.5, issued Nov. 6, 2013.

Yang Xianwan et al. eds, Mettalurgical Industry Express, Biohydrometallurgy, 1st edition, Sep. 30, 2003, related pp. 204-207.

* cited by examiner

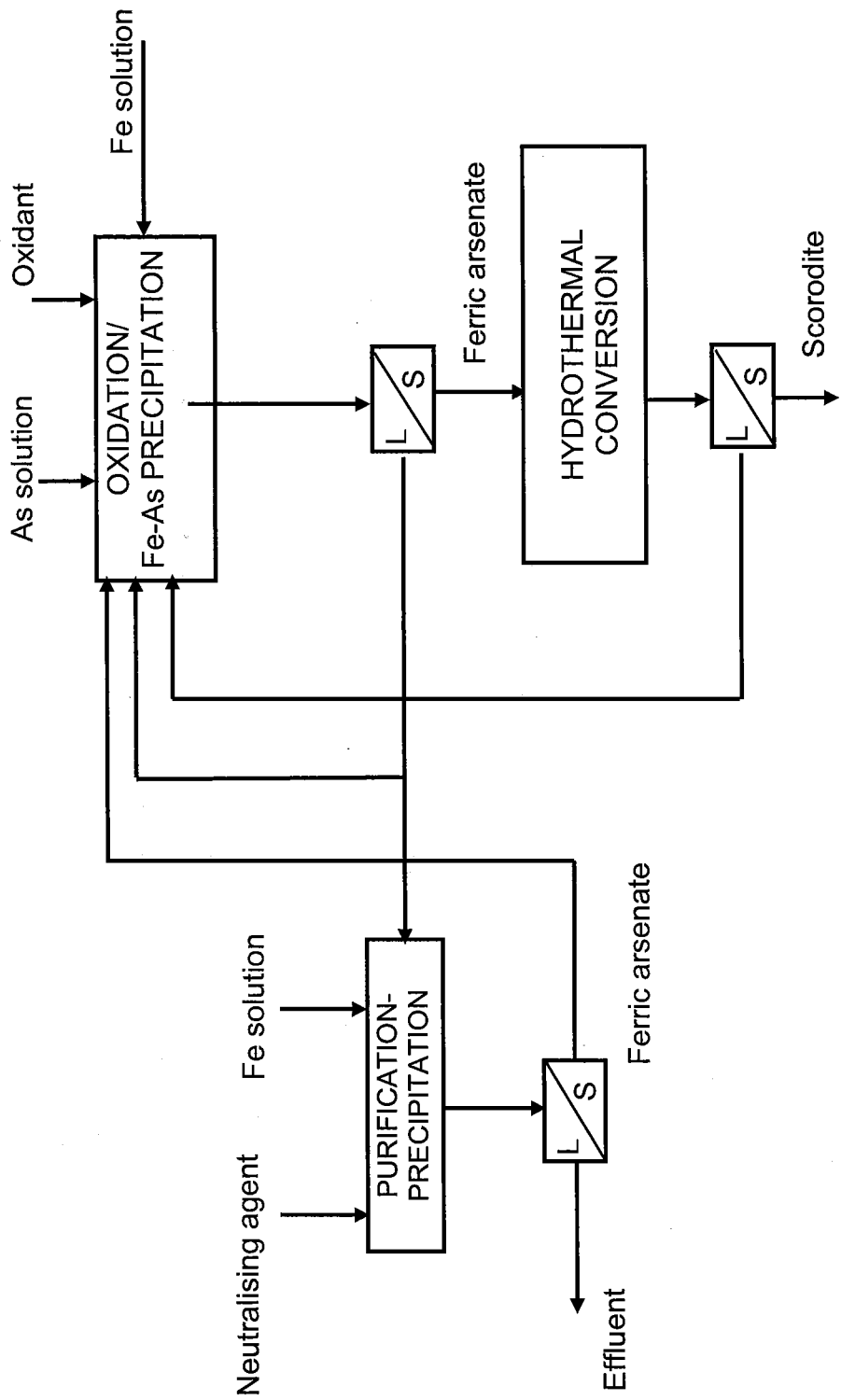

METHOD FOR REMOVING ARSENIC AS SCORODITE

This is a national stage application filed under 35 USC 371 based on International Application No. PCT/FI2010/050114 filed Feb. 19, 2010, and claims priority under 35 USC 119 of Finnish Patent Application No. 20090066 filed Feb. 23, 2009.

FIELD OF THE INVENTION

The invention relates to a method for removing arsenic as scorodite from solutions that contain iron and arsenic. In accordance with the method arsenic is first precipitated as ferric arsenate and subsequently treated hydrothermally into crystalline scorodite.

BACKGROUND OF THE INVENTION

In nature, arsenic appears in many different formations. Very commonly, arsenic associates with iron and copper, but also with nickel, cobalt, gold and silver. Arsenic is also the most important impurity to be removed during recovery of non-iron metals. During pyrometallurgical processes the majority of the arsenic remains in fly ash of the waste heat boiler and the electric furnace. The utilization of arsenic has not increased in relation to its recovery, so the majority of arsenic has to be stored in the form of waste. Since arsenic and its compounds are toxic, they must be made into the least soluble form possible before being removed from the process. The most poorly soluble arsenic compounds at neutral pHs are for example zinc, copper and lead arsenates, but the binding of arsenic to these valuable metals has not been seriously considered precisely due to the valuable metal content of what will remain as waste. One arsenic precipitation method used a lot nowadays is to precipitate arsenic with iron as ferric arsenate, which is quite poorly soluble. In particular, the crystalline form of ferric arsenate, scorodite, $FeAsO_4 \cdot 2H_2O$, is more poorly soluble than its other form, amorphous ferric arsenate.

The hydrothermal precipitation of arsenic as poorly soluble scorodite has been known for a long time. Scorodite formed hydrothermally at a temperature of over 150° C. is very poorly soluble and its arsenic content is in the region of 30%, so it is a fairly effective way to bind arsenic as a product that does not pollute the environment. Up until now, the greatest obstacle to use of the method has been the economic cost of the autoclave, since the method demands quite a large autoclave, because the arsenic concentration of the solution to be treated is generally rather low. The method is considered economically viable, if it has been possible to combine it with the oxidation of some valuable metal, such as gold concentrate. It is mentioned in U.S. Pat. No. 7,314,604 that no autoclave is known to be in use solely for the formation of scorodite.

Nowadays the possibility of preparing scorodite at temperatures of maximum 100° C. or at ambient pressure has been well researched. In the article by Wang, Q. et al: "Arsenic Fixation in Metallurgical Plant Effluents in the Form of Crystalline Scorodite via a Non-Autoclave Oxidation-Precipitation Process", Society for Mining Metallurgy and Exploration, Inc, 2000, a method for removing arsenic from fly ash is described, where arsenic is recovered as scorodite. The first processing stage of the arsenic-containing material is the oxidation of trivalent arsenic (As(III)) to pentavalent (As(V)) with a gas containing sulphur dioxide and oxygen in acidic conditions, in which arsenic does not precipitate. After this, arsenic precipitation is performed in atmospheric conditions, in which the Fe(III)/As(V) molar ratio is specified to be 1. Precipitation is carried out either in one or several stages, but precipitation as scorodite demands the over-saturation of the solution, which is achieved by recycling scorodite crystals to the first reactors of the precipitation and simultaneously neutralising the suspension. The preferred pH zone is in the region of 1-2 and this is maintained by feeding a suitable neutralising agent into the precipitation stage. In these conditions arsenic can be precipitated to the level of 0.5 g/l. The final arsenic removal to the level of below 0.1 mg/l is done by means of a second purification step, in which the iron and arsenic Fe(III)/As(V) molar ratio is adjusted to the area of 3-5 and the pH to 3.5-5. The amorphous precipitate generated in this stage is routed back to the first precipitation stage, where it dissolves and precipitates again as scorodite.

It is stated in the article by Singhania, S. et al: Acidity, Valency and Third-Ion Effects on the Precipitation of Scorodite from Mixed Sulfate Solutions under Atmospheric-Pressure Conditions, in Metallurgical and Materials Transactions B, Vol. 37B, April 2006, pp. 189-197, that the precipitation occurring in atmospheric pressure conditions should be performed as a controlled crystallisation, which results in well-crystallised scorodite. Crystallisation depends on the pH of the precipitation solution and its control as well as the amount of iron and arsenic and their ratio in the solution.

A method is described in U.S. Pat. No. 6,406,676 for removing arsenic and iron from an acidic solution generated in the hydrometallurgical processing of concentrate. Arsenic and iron precipitation are performed in two stages, whereby the pH is kept in the range of 2.2-2.8 in the first precipitation stage and in the range of 3.0-4.5 in the second stage. Lime is routed to both precipitation stages and, in addition, air is added to the second. A separate iron-arsenic precipitate exits each stage, and the precipitate from the second stage is recycled to the first stage, whereby any remaining unreacted lime can be utilised in the first stage. The precipitate from the second stage can also be recycled to the beginning of the same stage in order to improve the crystallisation of the precipitate. According to the example, the method has been applied for a zinc-containing solution and it is noted there that zinc does not precipitate with the iron and arsenic, but can be recovered after this treatment. The temperature at which the precipitations were carried out is not mentioned in the patent, but they presumably take place at ambient pressure. Nor does the publication mention the form in which the iron and arsenic are precipitated.

US patent application 2008233023 refers to Japanese application 2005-161123, in which a method for removing arsenic from soot is described. According to the method, arsenic-containing soot is dissolved in an acidic solution and precipitated as amorphous iron arsenate by mixing an iron-containing acidic solution into the first solution. The amorphous iron arsenate generated is crystallised by heating the mixed solutions. The crystallised iron arsenate is removed by filtration. An elevated temperature of 95° C. is mentioned in the Japanese application, so the process is performed at atmospheric pressure.

The prior art described above provides a good picture of current arsenic precipitation methods and the trend seems to be for the removal of arsenic from solution or precipitate by turning it into scorodite at atmospheric pressure. The drawback of the methods is that the formation of very poorly soluble scorodite, in which the arsenic concentration is high, is still uncertain at atmospheric pressure, or it demands highly controlled conditions. The hydrothermal formation of scorodite by routing iron- and arsenic-containing solutions directly into an autoclave has proved a financially costly solution, even though scorodite is the most poorly soluble arsenic compound possible. The solubility of scorodite in the US Environmental Protection Agency's TCLP test (Toxicity Characteristic Leaching Procedure) is below 5 mg/l.

PURPOSE OF THE INVENTION

The purpose of the method in accordance with this invention is to eliminate the drawbacks of the methods of the prior art and obtain a very poorly soluble precipitate, in which arsenic is in crystalline form as scorodite.

SUMMARY OF THE INVENTION

The invention relates to a method for precipitating iron and arsenic as a poorly soluble compound from an aqueous acidic solution. In accordance with the method, an iron-containing solution and an arsenic-containing solution are oxidised by means of an oxidant so that the iron is oxidised to trivalent and the arsenic to pentavalent. The iron and arsenic are precipitated as ferric arsenate at atmospheric pressure, so that the iron-arsenic ratio is adjusted to around 1-3.5 and the pH to the region of 1.5-4.5. The ferric arsenate precipitate that is formed is routed to hydrothermal conversion at a temperature of 150-200° C., in which ferric arsenate crystallises as poorly soluble scorodite.

According to one preferred embodiment of the invention, in the ferric arsenate precipitation stage the iron-arsenic ratio is adjusted to between 1-1.5. In the ferric arsenate precipitation stage the pH is preferably in the region of 1.5-2. Hydrothermal conversion is typically carried out at a temperature of 160-180° C.

According to one preferred embodiment of the invention, the small amount of arsenic remaining in solution in ferric arsenate precipitation is removed in the purification precipitation stage. After the ferric arsenate precipitation stage, liquid-solids separation is performed, from which the solids are routed to hydrothermal conversion and the solution is routed at least partially to the purification precipitation stage. After the solution purification precipitation stage, liquid-solids separation is performed, from which the solids are treated so that the arsenic contained in the solids dissolves and the solution is routed to ferric arsenate precipitation. The solution exiting liquid-solids separation is effluent. The Fe/As ratio of the purification precipitation stage is adjusted to the region of 3-5 and the pH to the region of 3.5-5.

According to one embodiment of the invention, the solution of the ferric arsenate precipitation stage is routed back at least partially to the ferric arsenate precipitation stage.

According to one embodiment of the invention, the hydrothermal conversion solution is routed back at least partially to the ferric arsenate precipitation stage.

According to another embodiment of the invention, the hydrothermal conversion solution is routed at least partially to the purification precipitation stage.

According to one embodiment of the invention, the oxidation of iron and arsenic is performed separately before the ferric arsenate precipitation stage.

According to another embodiment of the invention, the iron- and arsenic-containing solutions are routed together and oxidised at the same time in the ferric arsenate precipitation stage.

According to one embodiment of the invention, the oxidant of the ferric arsenate precipitation stage is at least one of the following group: oxygen, hydrogen peroxide, manganese dioxide, or oxygen with sulphur dioxide.

LIST OF DRAWINGS

FIG. 1 is a flow chart of the method accordant with the invention.

DETAILED DESCRIPTION OF THE INVENTION

In the method accordant with the invention, an arsenic-containing waste is formed essentially in two stages, whereby ferric arsenate is formed in the first stage and scorodite in the second. Since arsenic is generally trivalent in acidic solution, it must first be oxidised to pentavalent. Likewise dissolved iron is often divalent and it must be oxidised to trivalent. Arsenic and iron can be oxidised before they are introduced to the precipitation stage, but oxidation can also beneficially take place simultaneously in the precipitation stage. In accordance with FIG. 1, oxidation occurs simultaneously in the first stage of the method. The oxidising substance used is some known oxidant such as hydrogen peroxide, manganese dioxide, oxygen, or oxygen with sulphur dioxide.

Thus the first stage of the method is a precipitation or oxidation-precipitation stage, into which arsenic- and iron-containing solutions are routed, and which takes place at atmospheric pressure. It is characteristic of the ferric arsenate precipitation stage that the molar iron-arsenic ratio is adjusted to the region of 1-3.5, preferably to the region of 1-1.5. The tests we carried out showed that for the formation of scorodite, it is beneficial that the Fe—As ratio in the ferric arsenate precipitation stage is not too high. The pH of the precipitation stage is adjusted to the region of 1.5-4.5, preferably to the region of 1.5-2. Ferric arsenate residue is formed in precipitation, and is routed to liquid-solids separation. Since the iron/arsenic ratio is relatively low, as stated above, the residue formed is highly filterable.

The majority of the solution obtained from the liquid-solids separation of ferric arsenate can be recycled to the start of the process, i.e. back to the ferric arsenate precipitation stage. If required, the solution stream can be taken out of the process in order to correct the water balance of the process. In this way the arsenic remaining in the solution can be removed by routing the solution to the purification precipitation stage. This alternative is presented in FIG. 1, according to which part of the solution is routed to the purification precipitation stage, so that the arsenic can be removed from the solution as carefully as possible. The purification precipitation stage also operates at atmospheric pressure and in it the molar ratio of iron and arsenic Fe(III)/As(V) is adjusted to the region of 3-5 and the pH to the region of 3.5-5. Only a very small part of the solution, around 1-10%, is routed to the purification precipitation stage. If required, more iron-containing solution and a neutralising agent are routed to the purification precipitation stage. One useful neutralising agent is lime. After the post-purification precipitation liquids-solids separation, depending on the overall process, the ferric arsenate precipitate formed in the purification stage is routed either to a suitable preceding process step, in which it dissolves, or to a separate ferric arsenate leach (not shown in detail in the drawing), from which the solution is routed back to the ferric arsenate precipitation stage of the main process. The solution exiting the scorodite conversion stage is recycled back to the process. These procedures enable all the arsenic to be turned into scorodite form.

The ferric arsenate precipitate formed in the ferric arsenate precipitation stage is routed to the hydrothermal conversion stage, which is performed in an autoclave at a temperature of 150-200° C., preferably at a temperature of 160-180° C. Research has revealed that the scorodite formed at the above-mentioned temperature corresponds to the scorodite found as a natural mineral, which is very poorly soluble. The essential benefit of the method is the fact that the size of the autoclave now required can be only around ½-1/10 of the autoclave needed if the whole process is performed in an autoclave as a one-stage process. After the post-autoclave liquids-solids separation, the arsenic concentration of the solution in the method accordant with the invention is only about 10-100 mg/L, whereas in the single-stage treatment of the prior art it may be 0.5-5 g/L. The solution removed from the autoclave is routed either totally or partially to the ferric arsenate precipitation stage. Part may also be routed to the purification precipitation stage. In that case, the only solution removed from the process is the arsenic-free effluent routed out of the purification precipitation stage.

It is characteristic of the method that the iron-arsenic ratio is adjusted as early as the first precipitation stage to the region that is ideal regarding scorodite precipitation. In addition, it is characteristic of the method that no arsenic-containing residues other than the scorodite residue are generated in the process, by means of controlling the residual concentrations in the solutions after ferric arsenate precipitation and scorodite conversion.

EXAMPLES

Example 1

The examples illustrate the method of application of the invention and demonstrate the functionality of the invention in the conditions described above. The tests carried out were two-stage, in the first stage of which arsenic and iron were precipitated from solution as ferric arsenate and in the second stage the precipitated ferric arsenate was converted into scorodite. The ferric arsenate precipitations were done in a titanium reactor, which contained a gls-type mixer and baffles. In the tests the pH value was held constant by adding calcium hydroxide to the reactor. The ferric arsenate precipitate generated in ferric arsenate precipitation was filtered and transferred to an autoclave for hydrothermal scorodite conversion. Water was added to the autoclave as well as sulphuric acid so that the pH of the solution was in the range of 0.8-1.

A total of three combined ferric arsenate precipitation and scorodite conversion tests were made and the conditions of these tests are presented in Table I. In test 3 oxygen and sulphur dioxide gases were used to oxidise the metals. In tests 1 and 2 solutions were used in which the oxidation degrees of iron and arsenic were ready at $Fe^{3+}$ and $As^{5+}$ and since this was the case, oxidation was not required. The formation of scorodite was proven by means of X-ray diffraction (XRD) analyses of the final and intermediate sample residues. Scorodite was formed in tests 1 and 3 but not in test 2, in which the Fe—As ratio of the precipitate was higher than in the other tests. The concentrations of the final precipitates and final solutions from ferric-arsenate precipitation are presented in Table II as well as the metal concentrations of the final residue and the final solution of scorodite conversion in Table III. The stability of the scorodite residue was established using CEN stability tests accordant with the European standard SFS-EN 12457-3:2002. The results of the CEN tests are presented in Table IV. The amount of arsenic in the final residues accordant with the tests is relatively low, but this is due to the large amount of gypsum in the residues.

TABLE I

Test conditions.

| Test | | 1 | 2 | 3 |
|---|---|---|---|---|
| Ferric arsenate precipitation | | | | |
| T | °C. | 30 | 30 | 90 |
| pH | | 4 | 4 | 1.8 |
| Fe:As ratio | | 1.7 | 3.9 | 1.14 |
| time | h | 6 | 6 | 12 |
| Fe(II) | g/L | | | 9 |
| Fe(III) | g/L | 14 | 23 | |
| As(III) | g/L | | | 8 |
| As(V) | g/L | 11 | 8 | |
| $O_2$ | mL/min | | | 1000 |
| $SO_2$ | mL/min | | | 50 |
| Solution volume | L | 4 | 4 | 2.7 |
| Autoclave conversion | | | | |
| T | °C. | 160 | 160 | 160 |
| pH | | 1 | 0.8 | 0.8 |
| time | h | 4 | 6 | 6 |
| scorodite formed | | yes | no | yes |

TABLE II

Metal concentrations of the final residue and final solution of ferric arsenate precipitation.

| | As mg/l | Fe mg/l | As % | Fe % |
|---|---|---|---|---|
| Test 1 | 0.79 | 1.4 | 11.2 | 13.2 |
| Test 2 | 62.3 | 975 | 5.2 | 15 |
| Test 3 | 22 | 198 | 7.7 | 6.2 |

TABLE III

Metal concentrations of the final residue and final solution of scorodite conversion.

| | As mg/l | Fe mg/l | As % | Fe % |
|---|---|---|---|---|
| Test 1 | 103 | 702 | 13.5 | 14.5 |
| Test 2 | 20 | 1050 | 6.7 | 17.7 |
| Test 3 | 27.8 | 470 | 9.6 | 7.3 |

TABLE IV

Results of CEN stability tests. Two-stage CEN test

| A(2-10) | As mg/kg | Fe mg/kg | SO4 mg/kg |
|---|---|---|---|
| Test 1 | <2 | 60.4 | 16370 |
| Test 2 | <2 | 101 | 20344 |
| Test 3 | <1 | <1 | 20092 |

As shown by the examples, it is possible to produce very poorly soluble scorodite with the method according to the invention in fairly simple operating conditions.

The invention claimed is:

1. A method for precipitating iron and arsenic as a poorly soluble compound from acidic aqueous solutions, characterised in that an iron-containing solution and an arsenic-containing solution are oxidised by means of an oxidant so that the iron is oxidised to trivalent and the arsenic to pentavalent and that iron and arsenic are precipitated in a ferric arsenate precipitation stage as ferric arsenate at atmospheric pressure, whereby the iron-arsenic ratio and the pH are adjusted in the ferric arsenate precipitation stage to the region of 1-3.5, and the pH in the region of 1.5-4.5; the ferric arsenate precipitate formed is routed to hydrothermal conversion at a temperature of 150-200° C., at which the ferric arsenate crystallises as poorly soluble scorodite.

2. A method according to claim 1, characterised in that the iron-arsenic ratio in the ferric arsenate precipitation stage is adjusted to between 1-1.5.

3. A method according to claim 1, characterised in that the pH in the ferric arsenate precipitation stage is in the region of 1.5-2.

4. A method according to claim 1, characterised in that hydrothermal conversion is carried out at a temperature of 160-180° C.

5. A method according to claim 1, characterised in that arsenic remaining in solution after the ferric arsenate precipitation stage is removed from solution in a the purification precipitation stage.

6. A method according to claim 5, characterised in that liquid-solids separation is performed after the ferric arsenate precipitation stage, and the solids resulting from the liquid-solids are routed to hydrothermal conversion and a solution resulting from the liquid-solids separation at least partially to the purification precipitation stage.

7. A method according to claim 5, characterised in that liquid-solids separation is performed after the purification precipitation stage, and the solids resulting from the liquid-solids are treated so that arsenic contained in the solids dissolves and a solution resulting from the liquid-solids separation is routed to the ferric arsenate precipitation stage.

8. A method according to claim 5, characterised in that liquid-solids separation is performed after the purification precipitation stage, and exiting solution is effluent.

9. A method according to claim 5, characterised in that the iron-arsenate ratio of the purification precipitation stage is adjusted to the range 3-5 and the pH to the range of 3.5-5.

10. A method according to claim 1, characterised in that solution obtained from the ferric arsenate precipitation stage is routed at least partially back to the ferric arsenate precipitation stage.

11. A method according to claim 1, characterised in that a hydrothermal conversion solution is routed at least partially back to the ferric arsenate precipitation stage.

12. A method according to claim 1, characterised in that a hydrothermal conversion solution is routed at least partially to a purification precipitation stage.

13. A method according to claim 1, characterised in that the oxidation of iron and arsenic is performed separately before the ferric arsenate precipitation stage.

14. A method according to claim 1, characterised in that the iron- and arsenic-containing solutions are routed together and are oxidised simultaneously in the ferric arsenate precipitation stage.

15. A method according to claim 1, characterised in that the oxidant in the ferric arsenate precipitation stage is selected from at least one of the following group consisting of: oxygen, hydrogen peroxide, manganese dioxide, and oxygen with sulphur dioxide.

16. A method according to claim 5, characterised in that a solution hydrothermal conversion solution is routed at least partially to the purification precipitation stage.

* * * * *

UNITED STATES PATENT AND TRADEMARK OFFICE
CERTIFICATE OF CORRECTION

PATENT NO. : 8,790,516 B2  
APPLICATION NO. : 13/202762  
DATED : July 29, 2014  
INVENTOR(S) : Ruonala et al.

Page 1 of 1

It is certified that error appears in the above-identified patent and that said Letters Patent is hereby corrected as shown below:

In the Claims

Claim 5, Col. 7, Line 19
Change "tation stage is removed from solution in a the purification precipitation"
to read -- tation stage is removed from solution in a purification precipitation --;

Claim 7, Col. 7, Line 30
Change "solids are treated so that arsenic contained in the solids dis-"
to read -- solid separation are treated so that arsenic contained in the solids dis- --;

Claim 7, Col. 7, Line 31
Change "solves and a solution resulting from the liquid-solids separa-"
to read -- solves and a solution resulting from liquid-solid separa- --;

Claim 10, Col. 8, Line 7
Change "A method according to claim 1, characterized in that"
to read -- A method according to claim 1, characterized in that a --.

Signed and Sealed this
Twenty-first Day of October, 2014

Michelle K. Lee
*Deputy Director of the United States Patent and Trademark Office*